United States Patent
Idel et al.

[15] 3,657,946
[45] Apr. 25, 1972

[54] METHOD OF SHARPENING SAWS AND MACHINE FOR CARRYING SAME INTO EFFECT

[72] Inventors: Vladimir Viktorovich Idel, ulitsa Graftio, 15, kv. 6; Jury Vasilievich Tishin, ulitsa Michurina, 26, kv. 12, both of Zavolzhie Gorkovskoi Oblasti, U.S.S.R.

[22] Filed: Feb. 18, 1970

[21] Appl. No.: 12,163

[52] U.S. Cl.................................76/112, 76/41, 76/43
[51] Int. Cl..........................................B23d 63/00
[58] Field of Search...................76/43, 37, 41, 112, 35

[56] References Cited

UNITED STATES PATENTS

| | | | |
|---|---|---|---|
| 2,379,642 | 7/1945 | Kiechle | 76/41 |
| 2,434,691 | 1/1948 | Fields | 76/37 |
| 3,057,229 | 10/1962 | Oliver | 76/43 |

*Primary Examiner*—Bernard Stickney
*Attorney*—Waters, Roditi, Schwartz & Nissen

[57] ABSTRACT

The present invention relates to methods of sharpening saws. The herein-contemplated method envisages saw feed to the abrasive disk, its pitch feed with respect to the abrasive disk, and besides, the saw is so set that it can move to a certain extent with respect to the abrasive disk in the direction opposite to that of the pitch feed under the effect of the cutting force. Also contemplated is a machine for carrying said method into effect. The machine is characterized by the fact that it makes use of an additional elastic clamping means to hold the saw by its back surface and the support elements which the apexes of the saw teeth rest against.

10 Claims, 12 Drawing Figures

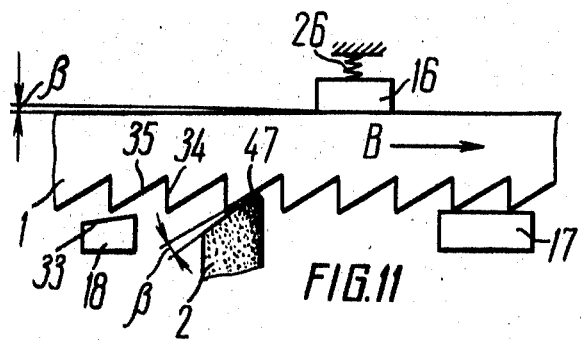
FIG.11
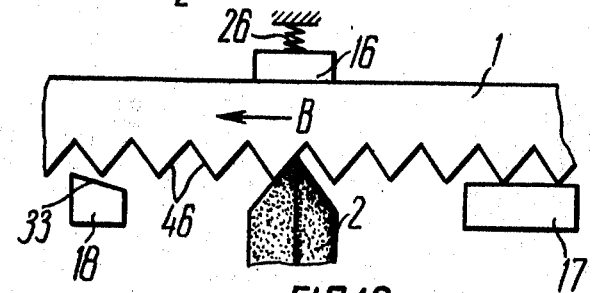
FIG.12
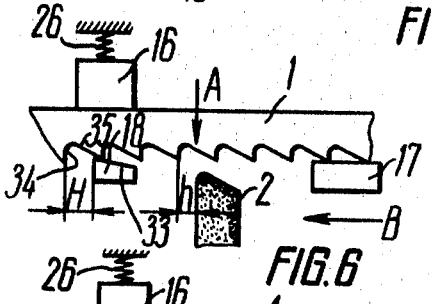
FIG.6
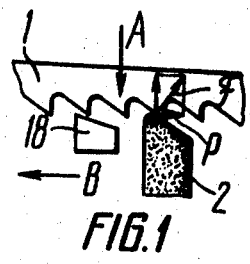
FIG.1
$H-h \geqq \Sigma \Delta$   FIG.7
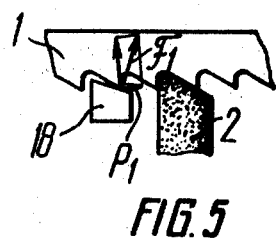
FIG.5
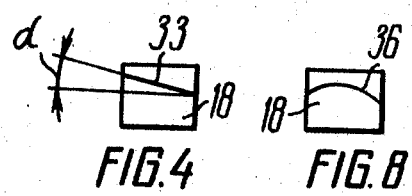
FIG.4   FIG.8

METHOD OF SHARPENING SAWS AND MACHINE FOR CARRYING SAME INTO EFFECT

The present invention relates to methods of sharpening band and circular saws as well as to machines capable of carrying said method of sharpening band saws into effect.

Widely known in the art are methods of sharpening band and circular saws where the saw to sharpen teeth thereof is fed to and abrasive disk and its pitch feed is accomplished to the abrasive disk in the direction from one tooth face to the other face of the following tooth.

Machines for implementation said method known heretofore incorporate a bed which mounts a grinding head with an abrasive disk and mechanisms for saw feed to the abrasive disk and pitch feed with respect to said abrasive disk. Besides, the above-mentioned machines incorporate an elastic clamping means to hold the saw in position in the process of sharpening thereof, which is arranged in the zone of sharpening the saw. Said clamping means is adapted to hold the side planes of the saw and features of clamping means whose pressing force is provided by strong plate springs. The saw rests by its back surface against rigid guides (rollers).

The above-mentioned clamping means ensures strictly oriented progressive saw pitch movement.

With such holding of the saw sharpening of its teeth is accomplished at low speeds (up to 100 teeth per minute) since with rigid fastening of the saw there is no possibility to compensate for thermal expansion of the saw and the abrasive disk, with the result that overheating of the surface to be treated occurs and wear out of the abrasive disk is increased. This is one of the facts which prevents the increase in the speed of saw sharpening (efficiency).

It is an object of the present invention to eliminate the above-mentioned disadvantages.

The main object of the present invention is to provide a method of saw sharpening where the saws to be sharpened would feature additional movement with respect to the abrasive disk under the effect of the cutting force, whereas the machine for implementation said method would feature elastic clamping means which would provide floating position of the saw with respect to the abrasive disk.

This object is accomplished by the fact that according to the method of saw sharpening which envisages saw feed to the abrasive disk and its pitch feed with respect to the abrasive disk as the latter sharpens the saw teeth in the direction from one tooth face to the other face of the following tooth, according to the present invention the saw is so set that in the process of sharpening it can move to a certain extent with respect to the abrasive disk under the effect of the cutting force in the direction opposite to that of the pitch feed, for which purpose the abrasive disk is so arranged that its apex at the moment of contacting the face of the tooth to be sharpened is close to the apex of said tooth and is spaced at a certain distance from the face of the neighboring tooth arranged in front of the abrasive disk in the direction of the pitch feed.

It is expedient that the saw in the process of pitch feed be retarded by making the support element contact successively with the apex of each tooth, which is so arranged that the nearby face of the neighboring tooth be located from said support element at the end of sharpening at a distance which exceeds the distance between the surface of the abrasive disk and one of the tooth faces being sharpened, by the value not less than the sum of the maximum permissible saw pitch deviation.

Retarding of the saw provides at high speeds of sharpening, orientation of the saw teeth with respect to the abrasive disk, while the respective arrangement of each tooth on the support element provides high quality of saw teeth sharpening.

The most effective solution is obtained in the case where after retarding the saw by the support element and orienting the saw teeth with respect to the abrasive disk, the saw, when it gets in contact with the abrasive disk, be turned counterclockwise or clockwise with respect to the corresponding support element.

This makes it possible to equalize the temperature duty within the zone of sharpening which in turn provides a possibility to increase the number of the teeth being sharpened per minute, or to increase cutting of metal in the process of saw teeth sharpening.

For carrying the aforementioned method into effect, a machine for sharpening bend saws has been developed which incorporates a grinding head with an abrasive disk and the mechanisms saw feed to the abrasive disk and for feed pitch of the saw, with respect to the abrasive disk, as well as an elastic clamping means to hold the saw in position by its side planes, according to the present invention said machine makes use of an additional elastic clamping means to hold the saw in position by its back surface as well as support elements against which the apexes of the saw teeth rest.

Installation of an additional elastic means in combination with an elastic clamping means to hold the saw in position by its side planes provides floating position of the saw in a machine with respect to the abrasive disk.

It is the most expedient that the above-mentioned additional clamping means be in fact a spring-loaded race with a roller interacting with the back surface of the saw, said race being mounted with a possibility to reciprocate at one end of the rod, while the other end of the rod passes through the housing and features endwise slots which receive the element adapted to fix the position of the rod with respect to the support element, and the rod features a set spring fitted thereon which widens between the wall of the housing and the protrusion provided on the rod and which is spaced from the end of the race at a distance sufficient for the saw to move freely between the support element and the roller in the race in the process of pitch feed.

Such implementation of an additional clamping means is the most simple and provides a possibility to constantly press the saw to the support elements with one and the same effort.

It is also expedient that the support element arranged in front of the abrasive disk as viewed in the direction of the pitch feed of the saw, feature a plane inclined or curvilinear surface counteracting successively with the apex of each saw tooth in the process of pitch feed of the saw to effect retardation of the saw.

Such implementation of the support element makes it possible to damp inertial forces arising in the process of saw movement when a great number of teeth are sharpened per minute (up to 500 teeth per min).

It has been proved experimentally that the most expedient thing is that the support element arranged in front of the abrasive disk as viewed in the direction of the saw pitch feed be made up of a fixed rectilinear portion whose surface, interacting with the apexes of the saw teeth, is parallel thereto, and a portion which is turnable in the crosswise direction to the motion of the saw spring-loaded portion, featuring a plane inclined or curvilinear surface which interacts with the apexes of the saw teeth.

Such a support element may be reasonably employed when sharpening saws featuring a pitch of not less than 6 mm, or when removing a considerable amount of metal from the front face of the tooth.

It has been proved experimentally that: (a) when sharpening band saws having different lengths of the saw faces and when the longer face of the tooth is arranged in the direction of saw pitch feed, an additional clamping means is required to be placed before the abrasive disk as viewed in the direction of the saw pitch feed; (b) when sharpening band saws having different lengths of the saw teeth and when the shorter tooth face is arranged in the direction of the saw pitch feed, it is necessary to arrange an additional clamping means past the abrasive disk as viewed in the direction of the saw pitch feed; (c) when sharpening band saws having identical lengths of the saw faces, it is expedient that an additional clamping means be arranged against the abrasive disk.

Such an arrangement of additional clamping means with respect to the abrasive disks provides improvement of temperature duties within the zone of sharpening.

The herein-contemplated method of saw sharpening and a machine for carrying said method into effect provide a possibility to increase the efficiency of the machine as compared with the heretofore known machines as high as two to four times. The contemplated machine is capable of sharpening of 200 to 400 teeth per minute depending upon the pitch with simultaneous improvement of the quality of teeth treatment.

The present invention will be described herein below by way of illustration of an exemplary embodiment thereof with due reference to the accompanying drawings, wherein:

FIG. 1 shows a schematic arrangement of the saw with respect to the abrasive disk;

Figure 10:
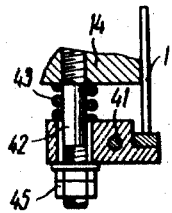
Figure 9:
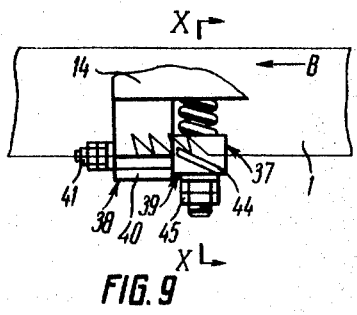
Figure 2:
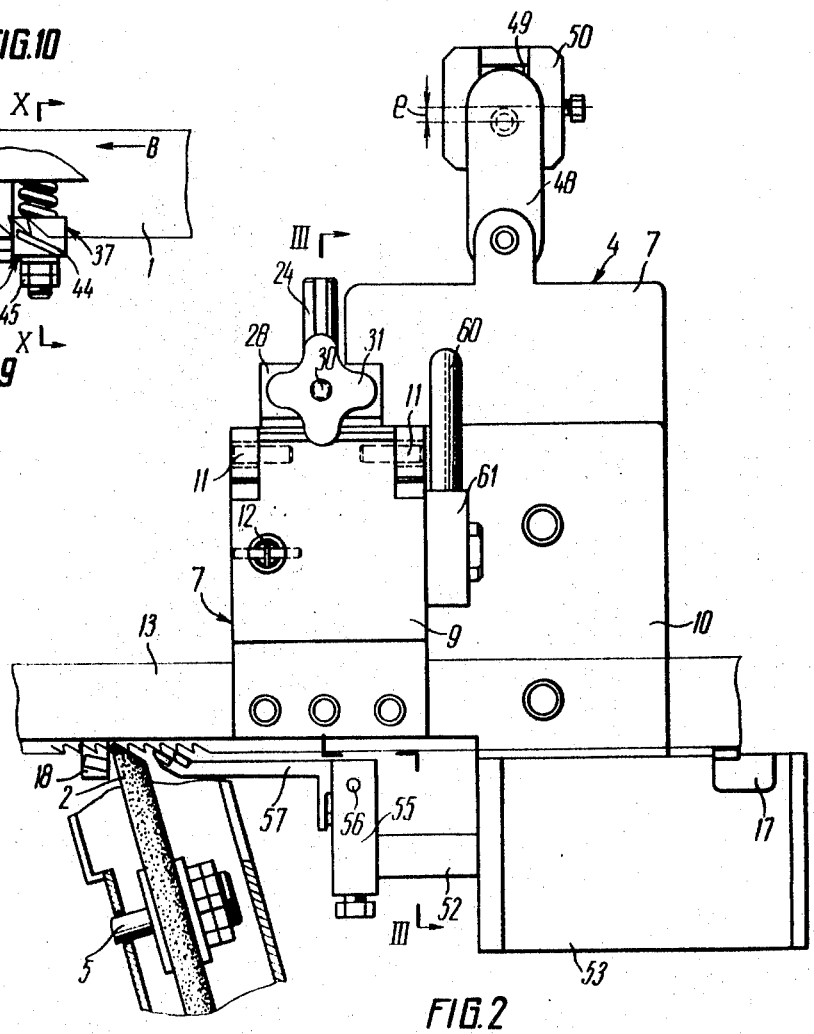
FIG. 2 is a machine for sharpening band saws, according to the present invention, top view.
Figure 3:
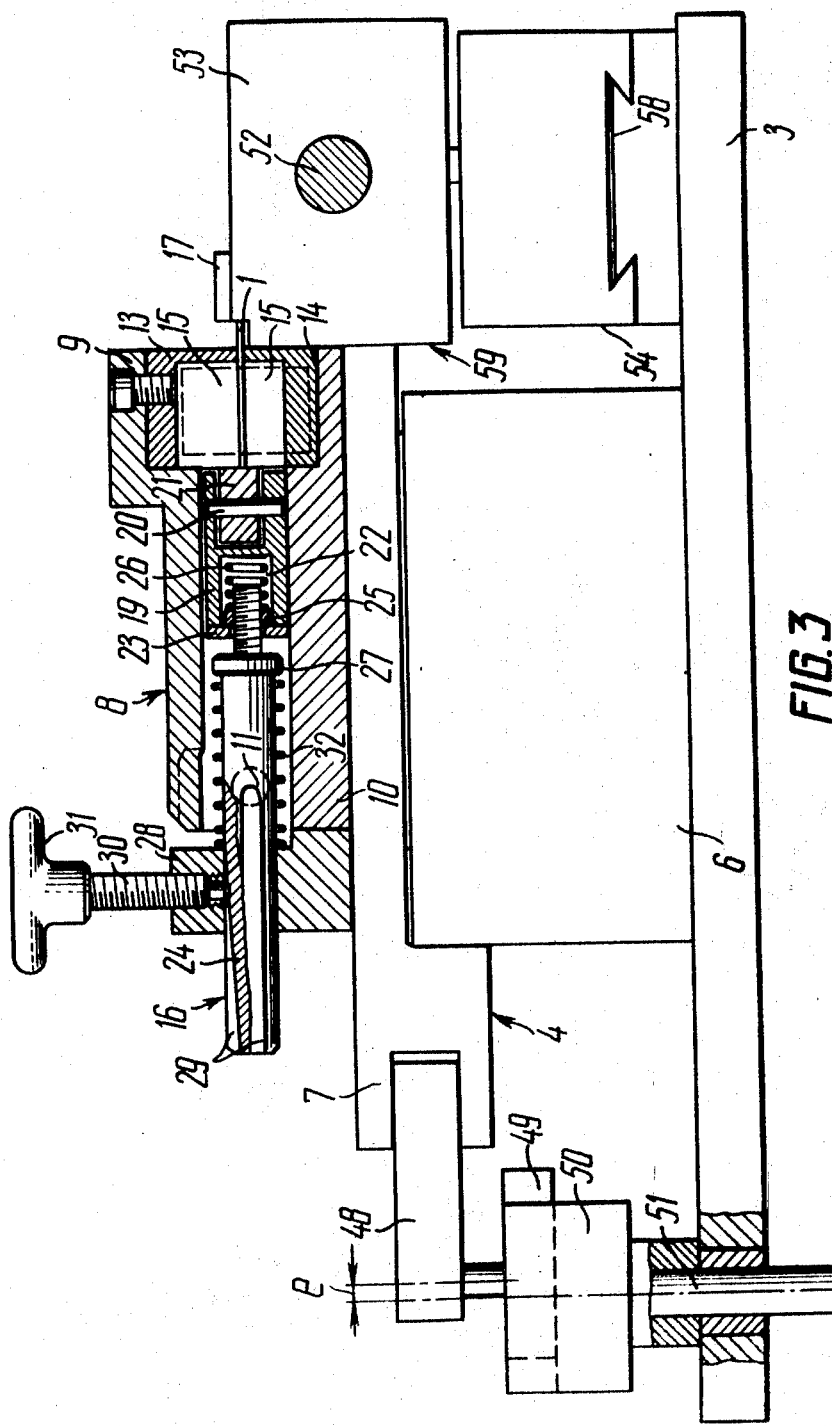

FIG.3 Same with a partial section III—III of FIG.2 side view;

FIG.4 shows a support element with a rectilinear inclined surface;

FIG.5 shows a schematic arrangement of a support element and the saw with respect to the abrasive disk at the end of saw teeth sharpening;

FIG.6 shows the position of support elements and an additional means with respect to the abrasive disk at the beginning of saw teeth sharpening;

FIG.7 shows the position of the support elements and an additional means with respect to the abrasive disk at the end of saw teeth sharpening;

FIG.8 is a support element with a curvilinear surface;

FIG.9 is a support element made up by two portions;

FIG.10 is a support element made up by two portions, section X—X of FIG.9;

FIG.11 shows the arrangement of an additional means past the abrasive disk as viewed in the direction of feed, and FIG.12 shows the arrangement of an additional means against the abrasive disk.

The present invention contemplates a method for saw sharpening consisting in that a saw 1 (FIG.1) whose teeth are to be sharpened is fed to an abrasive disk 2 as indicated by the arrow A and the saw is pitch fed with respect to the abrasive disk (as is indicated by the arrow B). Besides, the saw is so set that in the process of sharpening it can move to a certain extent with respect to the abrasive disk in the direction opposite to that of a pitch feed under the effect of the cutting effort arising in the process of saw teeth sharpening.

To provide movement of the saw 1 under the effect of the component P of the cutting force F in the direction opposite to the pitch feed, the abrasive disk 2 is so set that its apex at the moment of contact with the tooth being sharpened, is in a close proximity to the apex of said tooth and at a certain distance from the face of the neighboring tooth arranged in front of the abrasive disk as viewed in the direction of the pitch feed.

With a view of carrying said method into effect a machine for sharpening band saws is contemplated, the description of which will make the method of saw sharpening more apparent.

The machine for sharpening the saw 1 incorporates a bed 3 (FIGS. 2, 3) which mounts a mechanism 4 adapted to feed the saw to the abrasive disk 2. The abrasive disk 2 is arranged on a grinding head 5 which is mounted on the bed 3.

The bed 3 mounts a housing 6 of the mechanism 4. The guides (not shown in the drawing) arranged on said housing, mount a slide 7 which in its turn mounts an elastic clamping means 8 adapted to hold the saw in position by its side planes. Said means features a housing consisting of the two portions, an upper portion 9 and a lower portion 10. Both portions are interconnected by a joint 11, and spring-loaded with respect to each other by a spring 12 (FIG.3) whose pressing force is less than the cutting force F (FIG.1). The employment of said spring provides free movement of the saw in said means.

Made fast on the housing of the means 8 (FIGS. 2, 3) on the side of the saw 1 and on its upper and lower portions 9 and 10, are upper and lower guides 13 and 14, respectively, between which the saw 1 passes. The aforementioned guides mount rollers 15 between which the saw 1 moves. The rollers 15 are set on bearings which, for the sake of clarity of the drawing, are not shown. It is possible to makes the guides 13 and 14 integral with the upper and lower portions 13 and 14 of the housing, respectively. In this case when the rubbing surfaces are worn out, it is necessary to replace the entire housing.

The housing of the means 8 accommodates an additional elastic clamping means 16 adapted to hold the saw 1 in position by its back surface.

A support element 17 is made fast on the lower portion 10 of the housing of said means which the apexes of the teeth of the saw 1 rest against. The lower guide 14 mounts another support element 18.

The additional clamping means 16 is essentially a race 19 wherein on the side of the saw 1 and on the axis 20 a roller 21 is placed, which interacts with the back surface of the saw 1. The roller 21 is set in bearings which are not shown in the drawing for the sake of clarity thereof. On the opposite side the race 19 has a cavity 22 closed by a cover 23. This cavity receives the end of the rod 24 with a nut 24 arranged thereon. A spring 26 is arranged within the cavity 22 between its bottom and the nut 25.

The force of said spring is selected depending upon the guaranteed clamping force of the saw 1 with no blunting of the teeth apexes of the saw 1 in the process of pitch feed thereof. Due to the application of said spring, a reciprocative motion of the race is made possible on the rod 24. The rod 24 has a protrusion 27 arranged from the end of the race 19 (its cover 23), when the latter is in its extreme front position, at a distance sufficient for the saw to freely move between the support elements 17, 18, and the roller 21. This distance is determined by the maximum deviation of the saw size as to width.

Made fast on the lower portion 9 of the housing of the means 8 is a bracket 28 whose one opening receives the other end of the rod 24. This rod end has endwise slots 29 which interact with an element 30 adapted to fix the position of the rod 24 with respect to the support elements 17 and 18. For the herein-disclosed case the element 30 is in fact a bolt passing through the other opening provided in the bracket 28 and ending in a handle 31.

A set spring 32 is arranged on the rod 24 between the protrusion 27 and the housing wall which in this case is a bracket 28. Said spring is required to provide the garanteed pressing of the saw 1 to the supports elements 17 and 18. The protrusion 27 may be made as a bushing or nut featuring clamping means to fasten said bushing or nut on the rod 24.

The support element 18, arranged in front of the abrasive disk 2 as viewed in the direction of the pitch feed of the saw, has a plane inclined surface 33 (FIG.4). The angle of the inclination of said surface must be 14° maximum. This inclination is necessary that the saw 1 in the process of its movement may be retarded at high speed of the pitch feed which will make it possible to orient the teeth of the saw 1 with respect to the abrasive disk 2, i.e. will prevent the teeth of the saw I from slipping with respect to the abrasive disk 2, and, consequently, will make it possible to improve the quality of saw sharpening.

This retardation of the saw is provided by the component $P_1$ (FIG.5) of the force $F_1$ of the support element. The greater the angle $\alpha$, the larger the component $P_1$. The support element 18, arranged in front of the abrasive disk 2 as viewed in the direction of the pitch feed, and featuring the inclined surface, is set with respect to the abrasive disk at a minimum permissible distance which is approximately equal to one or to two pitches of the saw involved.

The apex of each saw tooth is set with respect to the inclined surface of the support element 18 so that the nearby face 34 of the neighboring tooth be spaced from it at a distance of $H$ (FIG.6) which exceeds the distance h between the surface of the abrasive disk 2 and the front face 34 of the tooth being sharpened, by the value larger than the sum of permissible saw pitch deviations $$H - h \geq \Sigma \Delta \qquad (7)$$

where $\Sigma\Delta$ is the sum of permissible saw pitch deviations.

Such setting of the apexes of the teeth of the saw 1 with respect to the support element 18 of the abrasive disk 2, is necessary to provide guaranteed sharpening of all the faces of the teeth of the saw 1.

It is possible that the surface 36 (FIG.8) of the support element 18, which interacts with the apex of the saw teeth, be curvilinear.

If the saws being sharpened feature their pitch not less than 6 mm, or when it is necessary to remove more metal from the front face of the tooth as compared with the back face of the tooth, it is expedient that the support element 37 (FIGS. 9, 10), arranged in front of the abrasive disk 2 as viewed in the direction of the step feed, be made of two portions 38 and 39. The portion 38 has a plane surface 39 arranged parallel to the saw teeth whose apexes rest against said surface. This portion of the support element 37 is fixed in position on the lower guide 17. The other portion 39 of the support element 37 is connected to the portion 38 by an axle 41 so as it can turn about said axle. Besides, an axle 42 passes through the portions 39, said axle being fastened on the lower guide 14. Arranged on said axle between the lower guide 17 and the end face of the portion 39 is a spring 43. The portion 39 of the support element 37 has an inclined surface 44 which the apexes of the teeth of the saw 1 rest against.

The spring 43 presses the inclined surface 14 of the support element 37. The force of pressing of the portion 39 of the support element 37 is less than that of the additional elastic clamping means 16. To control the position of the portion 39 of the support element 37 use is made of the nut 45.

It is possible that the surface of the portion 39 of the support element 37, which interacts with the apexes of the teeth, be curvilinear.

To provide the most favorable temperature duty within the zone of sharpening of the saw teeth, it is necessary that the additional elastic clamping means 16 be set with respect to the abrasive disk 2 depending upon the shape and arrangement of the tooth faces.

When sharpening band saws which have the tooth faces of different length, and when the longer face 35 (FIG.6) of the tooth is arranged in the direction of the pitch feed of the saw 1, the additional clamping means 16 is placed before the abrasive disk in the direction of the pitch feed.

When sharpening band saws, which have the tooth faces of different length, and when the shorter face 34 (FIG.11) is arranged in the direction of the saw pitch feed, the additional clamping means 16 is placed past the abrasive disk 2 in the direction of the pitch feed. With such an arrangement of the additional means 16 when the apex of the abrasive disk contacts the face 35 in the point 47, the saw 1 turns with respect to the support element 17 through $\beta$ angle. With further cutting of the abrasive disk into the face 35 $\beta$ angle decreases gradually under the effect of both the cutting force and the spring 26 of the additional means 16. Upon finishing the sharpening of the faces 34 and 35 of the teeth of the saw 1 $\beta$ angle equals 0. With such interaction between the longer face 35 of the tooth involved and the abrasive disk 2, there occurs a slower removal of metal from the face portion which is nearby the tooth apex, as compared with the entire length of the faces being sharpened, and consequently, the heat duty will be rather favorable within the tooth apex.

When sharpening saws which have the tooth faces 46 (FIG.12) of identical length, the additional clamping means 16 is placed against the abrasive disk 2 as is shown in FIG.12. Such an arrangement of the additional means is the most expedient for the saw which has the tooth faces of identical length, such an arrangement is likewise possible for the saws which have the teeth faces of different length.

To feed the saw 1 to the abrasive disk 2 the bed 3 is provided with the mechanism 4 mounted thereon (FIGS. 2, 3). Said mechanism incorporates a housing 6 which accommodates the guides (not shown in the drawing) on which the slide 7 interconnected by a connecting rod 48 runs, a crankpin 49 arranged within the housing 50 and provided with a shaft 51 operatively associated with the drive (not shown in the drawing).

To effect the pitch feed of the saw 1 with respect to the abrasive disk 2, the slide 7 is operatively connected by the guides (not shown in the drawing) with the slide 52 which is arranged within the housing 53 made as a solid casting with the lower portion 10 of the housing of the means 8.

The slide 52 is operatively associated with former 54 placed on the bed 3.

Made fast on the slide 52 is holder 55 wherein a spring-loaded arrester 57 is fitted on an axle 56, said arrester interacting with the teeth of the saw 1.

When orienting the teeth faces 34 of the saw 1 with respect to the support element 18 the finite points (dead points) of the movement arrester 57 are set by the displacement of the former 54 in the guides 58. The arrester 57 is so set that it is spaced at a distance of one or two teeth from the tooth being sharpened. Such arrangement of the arrester 57 makes it possible to reduce its idle runs as well as to increase the number of the teeth being sharpened per minute without impairing the quality of saw teeth sharpening. Such an arrangement of the arrester 57 has been possible due to carrying the contemplated method of saw sharpening into effect.

The former 54, the slide 52 and the arrester 58 together with the holder 55 form the mechanism 59 of the saw pitch feed.

The machine for sharpening band saws operates as follows.

When turning the handle 60 which is connected to an eccentric 61 arranged on the portion 9 of the housing of the means 8, said portion 9 turns about the joints 11. After that the saw 1 is placed on the lower guide 14. When placing the saw 1 the roller 21 and together with it the race 19 and the rod 24, move back compressing the set spring 32. Upon placing the saw 1, the spring 32 returns the race 19 together with the roller 21 back and presses the saw 1 to the support elements 17 and 18. Then the upper portion 9 is lowered down the side plane of the saw 1. Further, by using the element 30, the position of the rod 24 is fixed with respect to the support elements 17 and 18. After said operations, the saw 1 is clamped by its side plane between the roller 15 and the guides 13 and 14, whereas by its back surface and on the side of the teeth, the saw is clamped between the additional means 16 and the support elements 17 and 18.

As the saw 1 is clamped, the crankpin 49 of the feed mechanism 4 is set in the required eccentricity $e$ (FIG.3) selected depending upon the saw pitch. Simultaneously, the value of the pitch feed is automatically set with respect to the abrasive disk, that must be larger than the saw pitch to return the saw under the action of the cutting force in the direction opposite to the pitch feed by the value not exceeding the saw pitch.

Upon replacing the saw 1 and the setting the feed mechanisms 4 and 59, the machine drive (not shown in the drawing) is actuated, which operates the feed mechanisms 4 and 59. Likewise actuated is the drive (not shown in the drawing) which is adapted to rotate the abrasive disk 2. The saw 1 is fed to the abrasive disk 2 by the mechanism 4. When the apex of the abrasive disk 2 sets in contact with the face 35 at the point 47, the saw 1 turns clockwise with respect to the support element 17 by $\beta$ angle. With further cutting of the abrasive disk 2 into the face 35, $\beta$ angle decreases gradually and equals 0, when the process of sharpening of the faces 34, 35 of the saw teeth is finished. Since the saw 1, in this case features floating position, the cutting force P, with further cutting in of the abrasive disk 2, makes the saw move in the direction opposite to that of the pitch feed at a distance not exceeding one pitch of the saw in question.

When sharpening of the faces 34, 35 of the neighboring saw teeth is over, the saw 1 is brought out from contact with the abrasive disk 2 by means of the feed mechanism 4 and simultaneously, through the use of the arrester 57 the pitch feed of the saw is accomplished, since the following teeth of the saw 1 will arrive to be sharpened.

The experimental machine for sharpening band saws implemented according to the present invention, has passed long-time commercial tests and has shown the following speeds of teeth sharpening per minute:

a. at a 10–12 mm pitch 300 to 400 teeth per minute were sharpened, and b. at a 30-mm pitch 200 teeth per minute were sharpened.

The quality of saw tooth sharpening effected by the herein-contemplated method is substantially better as compared with the heretofore known methods.

We claim:

1. A method of sharpening saws comprising transversely feeding a saw whose teeth are to be sharpened towards an abrasive disk having a tapered working surface with an apex thereat, longitudinally feeding the saw with respect to the disk from one tooth face to the next after each tooth has been sharpened, displacing said saw with respect to the abrasive disk in a direction opposite the direction of longitudinal feed under the grinding action of the disk and in the course of grinding the tooth, and positioning the abrasive disk with respect to the saw so that the apex of the disk initially contacts the front face of the tooth to be sharpened proximate the apex of such tooth and at a distance from the back face of the neighboring tooth, the transverse feed of the saw producing sharpening of said front face as the disk advances therealong as the saw is being displaced under the grinding action until the disk penetrates to its full depth and sharpens the back face of said neighboring tooth whereafter the saw is transversely retracted and longitudinally advanced to the next tooth to be sharpened.

2. A method of sharpening saws as claimed in claim 1, wherein the course of pitch feed of the saw it is retarded by successively contacting each tooth apex with a support element, said tooth being so set with respect to said element that the nearby face of the neighboring tooth is spaced from it at a distance which exceeds that between the surface of the abrasive disk and one of the teeth faces being sharpened by said abrasive disk, by a value which is not less than the sum of the maximum permissible saw pitch deviations.

3. A method of sharpening saws, as claimed in claim 2, wherein after retarding the saw by the support element and orienting its teeth with respect to the abrasive disk, the saw, when it comes into contact with the latter, is turned with respect to the corresponding support element counterclockwise or clockwise.

4. A machine for sharpening a band saw, comprising: a bed, a grinding head with an abrasive disk fastened on said bed, a mechanism for saw feed to said abrasive disk arranged on said stand; a mechanism for pitch feed of the saw with respect to said abrasive disk mounted on said abrasive disk and operatively associated with said mechanism for saw feed to the abrasive disk; an elastic clamping means for holding the saw by its side planes which is placed on said mechanism for saw feed to said abrasive disk; an additional elastic clamping means for holding the saw by its back surface mounted in said elastic clamping means; support elements which the saw teeth apexes rest against, said elements being fixed in position on said elastic clamping means; and means adapted to actuate said feed mechanisms.

5. A machine as claimed in claim 4, comprising a housing said mechanism for pitch feed of the saw comprising a rod passing through said housing, said additional clamping means comprising a spring-loaded race with a roller, interacting with a back surface of the saw, and so mounted that it can reciprocate on one end of the rod, the other end of the rod passing through the housing and having endwise slots, means for fixing the position of the rod with respect to said support elements, a set spring on said rod widening between the housing and a protrusion provided on the rod spaced from the race at a distance sufficient for free movement of the saw between the support element and the roller of the race in the process of pitch feed.

6. A machine as claimed in claim 4, wherein the support element arranged in front of the abrasive disk in the direction of the saw pitch feed, has a planar inclined surface, interacting successively with the apex of each saw tooth in the process of saw pitch feed to retard the saw.

7. A machine as claimed in claim 4, wherein the support element arranged in front of the abrasive disk in the direction of the saw pitch feed, comprises a fixed rectilinear portion, whose surface, interacting with the apexes of the teeth is parallel thereto, and a spring-loaded portion which is turnable in the direction of the crosswise movement of the saw and having a planar inclined or curvilinear surface which interacts with the apexes of the saw teeth.

8. A machine as claimed in claim 4, wherein, when sharpening saws having teeth of different length with the longer tooth face being arranged in the direction of the saw pitch feed, said additional elastic clamping means is arranged before the abrasive disk as viewed in the direction of the saw pitch feed.

9. A machine as claimed in claim 4, wherein, when sharpening saws having the teeth faces of different length, with the shorter tooth face being arranged in the direction of the saw pitch feed, said additional elastic clamping means is arranged beyond the abrasive disk in the direction of the saw pitch feed.

10. A machine as claimed in claim 4, wherein, when sharpening saws having teeth faces of identical length, said additional elastic clamping means is arranged against the abrasive disk.

* * * * *